Figure 2:
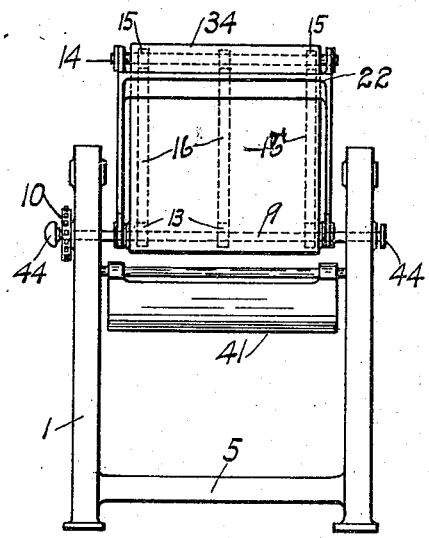

J. A. RIDGELY.
COMBINED POTATO AND VEGETABLE PEELER AND WASHER.
APPLICATION FILED NOV. 9, 1914.

1,185,715.

Patented June 6, 1916.
2 SHEETS—SHEET 1.

Witnesses
A. W. Aldemeyer
L. M. Dunlap

Inventor
James A. Ridgely
by John W. Strehli
Attorney

THE COLUMBIA PLANOGRAPH CO., WASHINGTON, D. C.

J. A. RIDGELY.
COMBINED POTATO AND VEGETABLE PEELER AND WASHER.
APPLICATION FILED NOV. 9, 1914.
1,185,715.
Patented June 6, 1916.
2 SHEETS—SHEET 2.
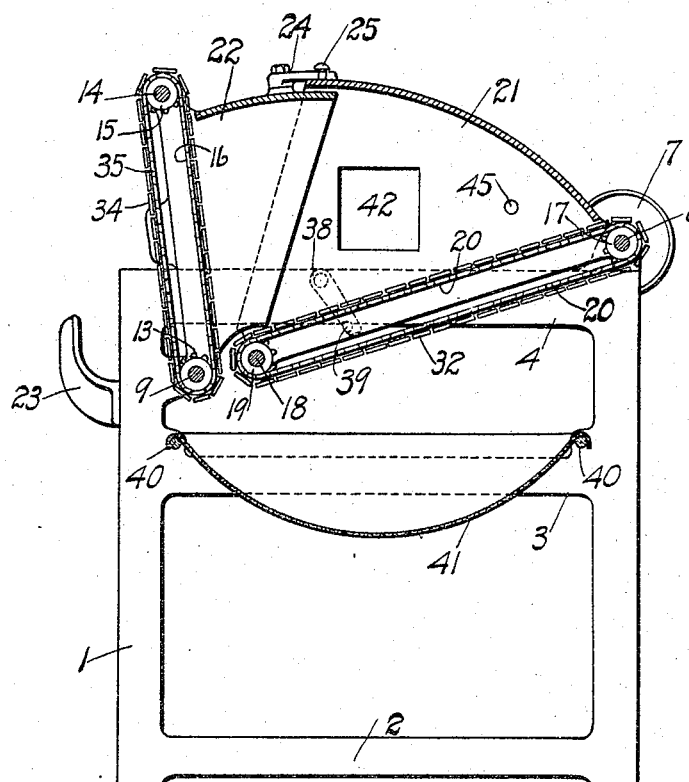
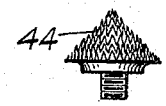
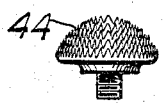
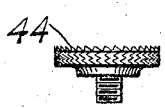
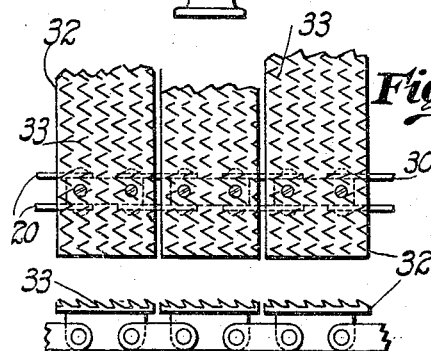
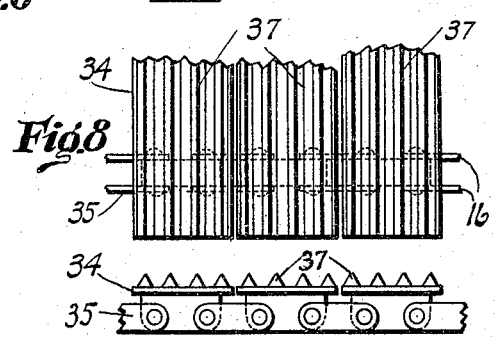
Witnesses
A. W. Aldemeyer.
L. M. Dunlap.
Inventor
James A. Ridgely
by John W. Strehli
Attorney

UNITED STATES PATENT OFFICE.

JAMES A. RIDGELY, OF CINCINNATI, OHIO.

COMBINED POTATO AND VEGETABLE PEELER AND WASHER.

1,185,715.  Specification of Letters Patent.  Patented June 6, 1916.

Application filed November 9, 1914. Serial No. 871,184.

*To all whom it may concern:*

Be it known that I, JAMES A. RIDGELY, a citizen of the United States, residing at the city of Cincinnati, in the county of Hamilton and State of Ohio, have invented certain new and useful Improvements in Combined Potato and Vegetable Peelers and Washers, of which the following is a specification.

The object of my invention is to produce a cheap, simple, and highly efficient machine for peeling and washing potatoes, apples, carrots, turnips, onions or any other kind of vegetables.

The machine will peel and wash one or more vegetables at a time or a very large number at a time, that is to say from one to a bushel or more; thus making it capable of use for a family, boarding house, restaurant or hotel.

It consists essentially, in supporting a moving or revoluble platform or bottom, a co-acting moving or revoluble reel set at an angle to said platform, a top formed of two hoods movably connected so as to be opened and closed, and a sieve underneath the movable platform into which the vegetables fall when peeled, and suitable water connections for washing same; the moving platform, formed of a series of metal slats connected together and provided on its face with a series of graters and the reel, also formed of a series of slats provided with a series of teeth or protuberances.

One of the main features of my invention consists in producing a movable platform provided with a grating surface and a reel set at an upright angle thereto and provided with protuberances, the platform and reel co-acting so that when vegetables are being peeled by the grating on the movable platform, they are carried down to and up against the revolving reel, which carries them up, assisting in peeling them, and then pitching them over and back upon the moving platform so that they will roll down again on said moving platform, which operation is repeated until the vegetables are thoroughly peeled; this peculiar operation enables me to thoroughly peel vegetables of any size, shape or configuration without waste of the surfaces of said vegetables.

Centrifugal and cylindrical vegetable peeling machines, on account of the force with which the vegetables are handled, take off too much of the outside surface of said vegetables, not only peeling them but also wasting them in part; my machine overcomes this rough handling of the vegetables on account of the peculiar action used by me for peeling, the action being so highly efficient that I am enabled to peel new potatoes, which have a very soft skin, without injury or waste.

The vegetable peeling machines now used will not remove the deep eyes on potatoes, or the flat spots or deformities in the vegetables, but I overcome these objections by providing revolving peelers or cutters on one of the revolving shafts on my machine against which the vegetable can be held to remove any unpeeled or uncleaned surface, which must now be done by hand when other machines are used.

Figure 1:
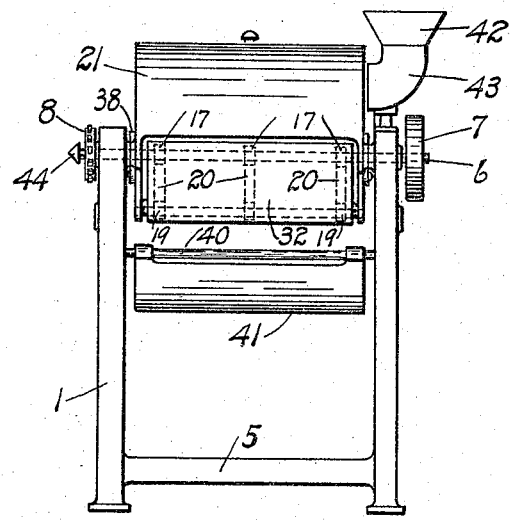
Figure 4:
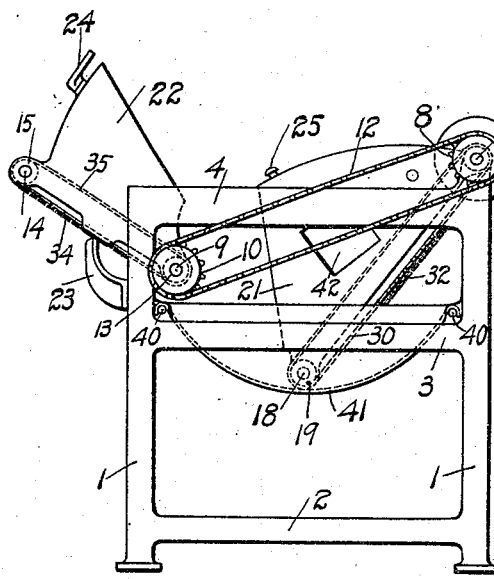
Figure 3:
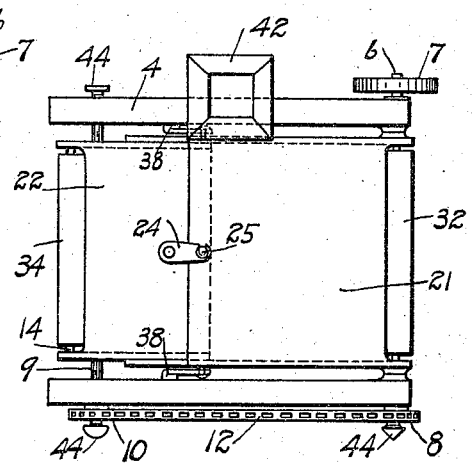

In the accompanying drawings forming part of this specification, Figure 1, is a view in elevation, looking toward the front of the machine. Fig. 2, is a view in elevation looking toward the rear of the machine. Fig. 3, is a top or plan view of the machine. Fig. 4, is a side view of the machine in elevation, the machine being open. Fig. 5, is an enlarged sectional view of the machine, the machine being closed. Fig. 6, is a plan view of the moving platform and the grating thereon, the parts being partly broken away. Fig. 7, is an end view of the parts shown in Fig. 6. Fig. 8, is a top view looking on the surface of the revolving reel, the parts being partly broken away. Fig. 9, is an end view of the parts shown in Fig. 8, and Figs. 10, 11 and 12 show various forms of cutting attachments placed on the revolving shaft of the machine for cutting out or peeling the defects in the vegetables which are not removed in the peeling and washing process.

The frame of the machine consists of uprights 1 and crosspieces 2, 3 and 4, and the crosspieces 5, suitably connected together. In the upper part of the frame of the machine, I suitably mount a shaft 6, carrying at one end a pulley 7, which, when driven, revolves the shaft 6. On this same shaft 6 I suitably mount sprocket wheel 8. I also provide a shaft 9 on which I suitably mount a sprocket wheel 10, a chain drive 12 passing over the sprocket wheels 8 and 10. On the shaft 9 are also mounted sprocket wheels 13 and on a shaft 14 I provide sprockets 15, a chain drive 16 passing over the sprockets 13 and 15. On shaft 6 I also place sprockets 17 and on a shaft 18 I place sprockets 19, a chain drive 20 passing over said sprockets 17 and 19.

The top of the machine is composed of two hoods or covers 22 and 21, the hood 22 being loosely connected so as to swing forward and backward, or out and in on shaft 9, and the hood 21 being loosely connected to swing downward and upward on shaft 6, being shown open in Fig. 4 and closed in Fig. 5. These hoods may be of any shape or contour and connected in any suitable way to swing in or out of position, so that the vegetables can be placed in the machine and taken out when peeled and washed. In the top of the hood 22, as shown, I connect the shaft 14, heretofore referred to, which shaft moves up and down or in and out with the hood 22 when said hood is opened or closed. The shaft 18, heretofore referred to, is connected to the hood 21, as shown, and the said shaft 18 and sprocket 19 and chain 20 fall or move down with the said hood 21, at its forward end, when the said hood is lowered as the machine is opened, see Fig. 4. The hood 22, when open, rests on brackets 23, see Fig. 4, and when closed the hoods 22 and 21 are held in a closed position by latch 24 on hood 21 engaging the lug 25 on the hood 21, see Fig. 5.

The bottom of the machine is composed of a revolving carriage or belt composed of a series of links 30, joined together to form a chain on which are suitably connected metal plates or slats 32 carrying grating surfaces 33; three of these link chains are usually used. This bottom rolls or passes over the shafts 6 and 18. The reel is similarly formed and consists of a series of links 35, forming chains on which are connected the metal plates or slats 34 having teeth or protuberances 37. This reel rolls or passes over the shafts 9 and 14.

The grating surfaces 33 on slats 32, and the protuberances 37 on slats 34 may be of any shape, size or contour, continuous or broken, and the slats may be connected together in any desirable manner, and the bottom and the reel may be made of one piece if desired, but are preferably formed as shown.

On the crosspiece 4 I connect a hanging latch 38, which engages and disengages with a pin 39 on the side of the hood 21, when engaged, as shown in Fig. 5, holding up the hood and the bottom, and when disengaged allowing the parts to fall down as shown in Fig. 4.

Under the movable bottom, I connect in the frame of the machine at points 40, on each side, a sieve basket 41 into which the vegetables pass when peeled, the vegetables remaining therein until removed, the peeling and refuse passing off through the holes in the sieve, together with the dirty water, to any point desired, not shown. The vegetables to be peeled and cleaned are placed into the hopper 42 and pass into the machine through the pipe 43. On the shaft 6, I place one or more of the cutting or peeling knives or burs 44, shown in Figs. 10, 11 and 12, against which, while the shaft 6 is revolving, the defects in the vegetables can be cut out, by holding said vegetables against said knives or burs. The shafts 6 and 9 are revolved by the chain 12 passing over sprockets 8 and 10, the shaft 14 is revolved by the belt 16 passing over sprockets 13 and 15 and the shaft 18 is revolved by the chain 20 passing over sprockets 19 and 17, and through these means the revolving platform or bottom and the revolving reel are placed in motion, said bottom and reel, formed as before stated passing over the shafts designated, all being initially started by power applied to the pulley 7 on the shaft 6.

Water is applied to the machine through a pipe 45, suitably supported and provided with any suitable means for allowing or cutting off the flow of water. The revolving platform or bottom and the revolving reel revolve in the direction indicated by arrows in Fig. 5.

When it is desired to operate the machine the vegetables to be peeled and cleaned are placed in the hopper 42 and passed down into the machine through the pipe 43 and fall upon the revolving platform, composed of the grated slats 32 striking against the grating 33 and as the platform carries them forward they are rolled over each other, again and again striking the grating 33, the skin being removed by said grating, and as they are carried forward they reach the reel, and by said reel and the protuberances 37 are carried upward and further peeled and then thrown over back on the revolving platform; this operation being repeated as often as found necessary to peel them perfectly; the water all the while cleaning the vegetables forcing the skin and refuse to pass down and out of the sieve 41 and from there off to any point desired. When the operator is satisfied that the vegetables are cleaned and peeled he opens the hoods 21 and 22, to the position shown in Fig. 4, and the vegetables fall into the sieve basket 41 from which they can be removed at will; any defects in the cleaning may be eradicated by holding the vegetables up against the burs 44 as before described. When the vegetables just peeled and cleaned have all been removed, the hoods may be closed up and the operation repeated.

Any auxiliary mechanism, such as flexible springs or fingers, may be used to assist in holding the vegetables on the grating, especially where only a few are being peeled.

The revolving platform and the revolving reel being formed of spaced slats and parts as described, in order to revolve over the shafts have a certain degree of flexibility, and in revolving the slats have a tendency to move up and down to a limited degree, thus forming an undulated surface, and this surface tends to further agitate the vegetables as they are passing over the grated surface, making it possible to more quickly and efficiently peel and clean them.

While I have described and shown specific means for carrying out my invention, it will readily be apparent, that the same is capable of change and modification without departing from the spirit and principle of the invention, and I wish to be understood as not limiting myself to the specific form herein shown, but claiming that such changes and modifications will still fall within the scope of my invention.

What I claim as new and my invention and desire to secure by Letters Patent is,

1. In a combined vegetable peeling and cleaning machine of the class described, a revolving platform having a grated surface and a revolving reel having a roughened surface and means for operating the same, hoods, said hoods pivotally connected, said platform and reel mounted in said hoods and a sieve basket under said revolving platform, said hoods being capable of being raised and lowered.

2. In a combined vegetable peeling and cleaning machine of the class described, a revolving platform having a grated surface and a revolving reel having a roughened surface and means for operating the same, hoods, said hoods pivotally connected, said platform and reel mounted in said hoods and a sieve basket under said revolving platform, said hoods being capable of being raised and lowered, and a water supply for said machine.

3. In a combined vegetable peeling and cleaning machine of the class described, a revolving platform composed of slats carrying a grating surface, a revolving reel carrying slats carrying protuberances on their face, hoods, said platform and reel mounted in said hoods, said hoods mounted so as to swing up and down, part of the actuating mechanism carried by the free end of said hoods and capable of moving up and down with said hoods when said hoods move down and up to be opened or closed, a basket sieve mounted under said platform, water supply connected to said machine, and means for operating the machine.

Witness my hand at Cincinnati Ohio this 29th day of Oct. 1914.

JAS. A. RIDGELY.

Witnesses:
HARRY BROMWORTH,
JOHN W. STREHLI.

Copies of this patent may be obtained for five cents each, by addressing the "Commissioner of Patents, Washington, D. C."